(12) United States Patent
Kashiwakura et al.

(10) Patent No.: US 12,333,937 B2
(45) Date of Patent: Jun. 17, 2025

(54) INFORMATION PROCESSING APPARATUS, AND METHOD

(71) Applicant: TOYOTA JIDOSHA KABUSHIKI KAISHA, Toyota (JP)

(72) Inventors: Toshiki Kashiwakura, Nagakute (JP); Takahiro Aoki, Nagoya (JP); Tsuyoshi Okada, Nagoya (JP); Hiromitsu Fujii, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 174 days.

(21) Appl. No.: 18/339,356

(22) Filed: Jun. 22, 2023

(65) Prior Publication Data
US 2023/0419831 A1 Dec. 28, 2023

(30) Foreign Application Priority Data
Jun. 23, 2022 (JP) .................. 2022-101318

(51) Int. Cl.
*G08G 1/123* (2006.01)
*G06Q 10/02* (2012.01)
*G06Q 50/40* (2024.01)
*G08B 7/06* (2006.01)
*H04W 4/02* (2018.01)

(52) U.S. Cl.
CPC ............. *G08G 1/123* (2013.01); *G06Q 10/02* (2013.01); *G06Q 50/40* (2024.01); *G08B 7/06* (2013.01); *H04W 4/025* (2013.01)

(58) Field of Classification Search
CPC ........ G08G 1/123; G08G 1/005; G06Q 10/02; G06Q 50/40; G08B 7/06; H04W 4/025
USPC .......................................................... 340/944
See application file for complete search history.

(56) References Cited

U.S. PATENT DOCUMENTS

| | | | |
|---|---|---|---|
| 6,700,506 B1 * | 3/2004 | Winkler | G08G 1/123 701/465 |
| 9,612,722 B2 * | 4/2017 | Miller | G06F 1/163 |
| 2014/0002239 A1 * | 1/2014 | Rayner | G08B 13/2462 340/5.61 |
| 2019/0080598 A1 * | 3/2019 | Walsh | G08G 1/0965 |
| 2021/0223051 A1 * | 7/2021 | Hochberg | G01C 21/3492 |

(Continued)

FOREIGN PATENT DOCUMENTS

| | | | |
|---|---|---|---|
| EP | 3623764 A1 * | 3/2020 | ......... G01C 21/3438 |
| JP | H08-063697 A | 3/1996 | |
| JP | 2019-178960 A | 10/2019 | |

(Continued)

*Primary Examiner* — Eric Blount
(74) *Attorney, Agent, or Firm* — Dickinson Wright, PLLC (57) ABSTRACT

An information processing apparatus acquires position information of a user terminal, and causes the user terminal to issue a first notification by audio or vibration in a case where a distance between a first point where a user of the user terminal is to get on board a vehicle provided for a predetermined service and the user terminal falls to or below a first distance, the first notification indicating that the first point is getting closer. The information processing apparatus causes the user terminal to issue a second notification by audio or vibration in a case where the distance between the first point and the user terminal falls to or below a second distance that is smaller than the first distance, the second notification indicating that the first point is getting closer.

15 Claims, 7 Drawing Sheets

(56) References Cited

U.S. PATENT DOCUMENTS

2023/0098779 A1* 3/2023 Mankowski ........... G06V 20/58
340/425.5

FOREIGN PATENT DOCUMENTS

| JP | 2021051431 A | 4/2021 | | |
|----|--------------|--------|----|----------|
| WO | WO-2022260966 A1 * | 12/2022 | ............. | G01C 21/20 |

* cited by examiner

INFORMATION PROCESSING APPARATUS, AND METHOD

CROSS REFERENCE TO THE RELATED APPLICATION

This application claims the benefit of Japanese Patent Application No. 2022-101318, filed on Jun. 23, 2022, which is hereby incorporated by reference herein in its entirety.

BACKGROUND

Technical Field

The present disclosure relates to an information processing apparatus, a method, and a terminal.

Description of the Related Art

There is disclosed a management apparatus that uses a current position of a user who is to get on board a vehicle traveling along an operation route that is determined in advance and sets a location closest to the user as a virtual bus stop that is a boarding location for the user, and that notifies the user of the position of the virtual bus stop (for example, Japanese Patent Laid-Open No. 2021-051431).

An aspect of the disclosure is aimed at providing an information processing apparatus and a method with which one can be guided to a boarding point of a vehicle that is provided for a predetermined service.

SUMMARY

An aspect of the present disclosure is an information processing apparatus including a processor configured to:
acquire position information of a user terminal; and
cause the user terminal to issue a first notification by audio or vibration in a case where a distance between a first point where a user of the user terminal is to get on board a vehicle provided for a predetermined service and the user terminal falls to or below a first distance, the first notification indicating that the first point is getting closer.

Another aspect of the present disclosure is a method executed by a computer including:
acquiring position information of a user terminal; and
causing the user terminal to issue a first notification by audio or vibration in a case where a distance between a first point where a user of the user terminal is to get on board a vehicle provided for a predetermined service and the user terminal falls to or below a first distance, the first notification indicating that the first point is getting closer.

Another aspect of the present disclosure is a terminal including a processor configured to:
acquire position information; and
issue a first notification by audio or vibration in a case where a distance between a first point of getting on board a vehicle and a current position falls to or below a first distance, the first notification indicating that the first point is getting closer.

According to an aspect of the present disclosure, a user may be guided to a boarding point of a vehicle that is provided for a predetermined service.

DESCRIPTION OF THE EMBODIMENTS

An on-demand bus that is operated based on a request from a user is known. With an on-demand bus, a bus stop is not installed, and a boarding point and an alighting point are dynamically set based on requests from a plurality of users. Accordingly, there is no sign at the boarding point of the bus, and a user may feel unsure about whether or not he/she correctly reaches the boarding point of the bus. This is even more so for visually disabled persons.

An aspect of the present disclosure is an information processing apparatus that causes a user terminal carried by a user to issue a notification, by audio or vibration, that a boarding point is getting closer. More specifically, the information processing apparatus includes a processor. The processor may be configured to acquire position information of the user terminal, and cause the user terminal to issue a first notification by audio or vibration in a case where a distance between a first point where the user of the user terminal is to get on board a vehicle provided for a predetermined service and the user terminal falls to or below a first distance, the first notification indicating that the first point is getting closer.

The information processing apparatus may be, but not limited to, a server, for example. The processor may be a processor such as a central processing unit (CPU), for example. The vehicle provided for the predetermined service may be a bus, a taxi, a vehicle of a ride-sharing service, or, a vehicle dispatch service, for example. The bus may be a bus that travels to bus stops installed along a predetermined route according to a predetermined timetable, or may be an on-demand bus that is operated in response to a request from a user. The on-demand bus may be a shared bus that allows a user to specify a boarding point, an alighting point, and a boarding date/time or an alighting date/time. The on-demand bus may be a bus that travels along a predetermined route, or a bus a route of which is set as appropriate according to the boarding points and the alighting points of a plurality of users who are to get on board. Accordingly, the first point may be a bus stop of a bus, or a boarding point of the on-demand bus. Additionally, the boarding point of a bus may include a bus stop that is used at the time of boarding the bus.

According to an aspect of the present disclosure, when a user who is to get on board the vehicle enters a range of the first distance of the boarding point, the user terminal of the user issues, by audio or vibration, a notification indicating that the boarding point is getting closer. The user may thereby grasp that the boarding point of the bus is getting closer. For example, in the case where the user is visually disabled, the aspect of the present disclosure may enable the user to grasp that he/she is correctly heading to the boarding point of the bus. For example, in the case of a user of the on-demand bus and in the case where there is no sign at the boarding point, the aspect of the present disclosure enables the user to grasp that the boarding point of the on-demand bus is getting closer. Therefore, according to the aspect of the present disclosure, a user may be guided to the boarding point of the vehicle that is provided for the predetermined service.

According to an aspect of the present disclosure, the processor may be configured to cause the user terminal to issue a second notification by audio or vibration in a case where the distance between the first point and the user terminal falls to or below a second distance, the second notification indicating that the first point is getting closer. The second distance is smaller than the first distance. Accordingly, the user may grasp that the boarding point of the bus is getting even closer, that he/she is correctly heading to the boarding point of the bus, and that the boarding point of the bus is not yet reached, for example.

Furthermore, in a case where the first notification and the second notification are both issued by audio, the processor may be configured to cause audio that is output from the user terminal or a mode of output of the audio to be different between the first notification and the second notification. The mode of output of the audio may be a volume and a playback speed, for example. The user may thus grasp what the notification from the user terminal indicates.

Furthermore, in a case where the first notification and the second notification are both issued by audio, the processor may be configured to adopt audio that is specified by the user terminal as audio that is output from the user terminal, in relation to at least one of the first notification and the second notification. Accordingly, audio that the user likes may be used as the audio that is output from the user terminal when a remaining distance to the boarding point of the bus reaches the first distance or the second distance, and the user may be prevented from feeling annoyed by the audio that is output from the user terminal, for example.

Furthermore, in a case where the first notification and the second notification are both issued by vibration, the processor may be configured to cause a mode of vibration of the user terminal to vary between the first notification and the second notification. The mode of vibration may be a pattern of vibration and intensity of vibration, for example. The processor may be configured to make vibration of the user terminal stronger for the second notification than for the first notification, for example. The user may thereby intuitively grasp that the boarding point of the vehicle is getting closer.

According to an aspect of the present disclosure, in a case where the first point is reached by the user terminal, the processor may be configured to instruct the user terminal to output waiting at a current position. The user may thereby grasp that the boarding point of the vehicle is reached, even in a case where there is no sign at the boarding point of the vehicle that is provided for the predetermined service, for example.

According to an aspect of the present disclosure, in a case where the first point is reached by the user terminal, the processor may be configured to notify the vehicle that the user is scheduled to get on of the position information of the user terminal. A driver of the vehicle may thus find the user even in a case where the user is waiting at a position that is offset from the boarding point of the vehicle, and this is advantageous to a user wanting to join the bus in a case where the user is visually disabled and in a case where the bus is an on-demand bus and there is no sign at the boarding point, for example.

According to an aspect of the present disclosure, the processor may be configured to acquire first information that is information about a reservation for use of the on-demand bus by the user and that includes at least a boarding point and a scheduled boarding time, and when a time that is a predetermined time length before the scheduled boarding time is reached, start determination of whether or not the distance between the first point and the user terminal is equal to or smaller than the first distance. A time period when the information processing apparatus is operated in relation to one reservation of one user may thereby be limited, and a processing load on the information processing apparatus may be reduced.

According to an aspect of the present disclosure, the processor may further be configured to cause the user terminal to issue a third notification by audio or vibration in a case where a distance between a second point where the user is to alight from the vehicle and the user terminal falls to or below a third distance, the third notification indicating that alighting approaches. The user may thereby grasp that he/she is soon to alight from the vehicle, after getting on board.

Furthermore, the processor may further be configured to cause the user terminal to issue a fourth notification by audio or vibration in a case where the distance between the second point and the user terminal falls to or below a fourth distance, the fourth notification indicating that alighting approaches closer. The fourth distance is smaller than the third distance. Accordingly, that alighting is coming closer may be announced in stages.

Furthermore, in a case where the third notification and the fourth notification are both issued by audio, the processor may cause audio that is output from the user terminal or a mode of output of the audio to be different between the third notification and the fourth notification. Alternatively, in a case where the third notification and the fourth notification are both issued by vibration, the processor may be configured to cause a mode of vibration of the user terminal to vary between the third notification and the fourth notification. Accordingly, a case where there remains the third distance or less to the alighting point and a case where there remains the fourth distance or less may be separately grasped even by a same notification method.

As another aspect of the present disclosure, there may be specified a method executed by a computer including performing a process of the information processing apparatus described above. The method executed by the computer including: acquiring position information of a user terminal, and causing the user terminal to issue a first notification by audio or vibration in a case where a distance between a first point where a user of the user terminal is to get on board a vehicle provided for a predetermined service and the user terminal falls to or below a first distance, the first notification indicating that the first point is getting closer. Furthermore, as another aspect of the present disclosure, there may be specified a program for causing a computer to perform a process of the information processing apparatus described above.

Moreover, a terminal may be specified as another aspect of the present disclosure. The terminal includes a processor configured to acquire position information, and issue a first notification by audio or vibration in a case where a distance between a first point of getting on board a vehicle provided for a predetermined service and a current position falls to or below a first distance, the first notification indicating that the first point is getting closer. The terminal may be a mobile terminal such as a smartphone, a tablet terminal, a wearable terminal, or the like, for example. As other aspects of the present disclosure, there may be cited a method for causing a computer to perform the processes of the terminal described above, and a program for causing a computer to perform the processes of the terminal described above. As another aspect of the present disclosure, a non-transitory computer-readable recording medium for each program may be specified.

In the following, embodiments of the present disclosure will be described with reference to the drawings. The configuration of the embodiments described below are examples, and the present disclosure is not limited to the configuration of the embodiments.

First Embodiment

Figure 1:
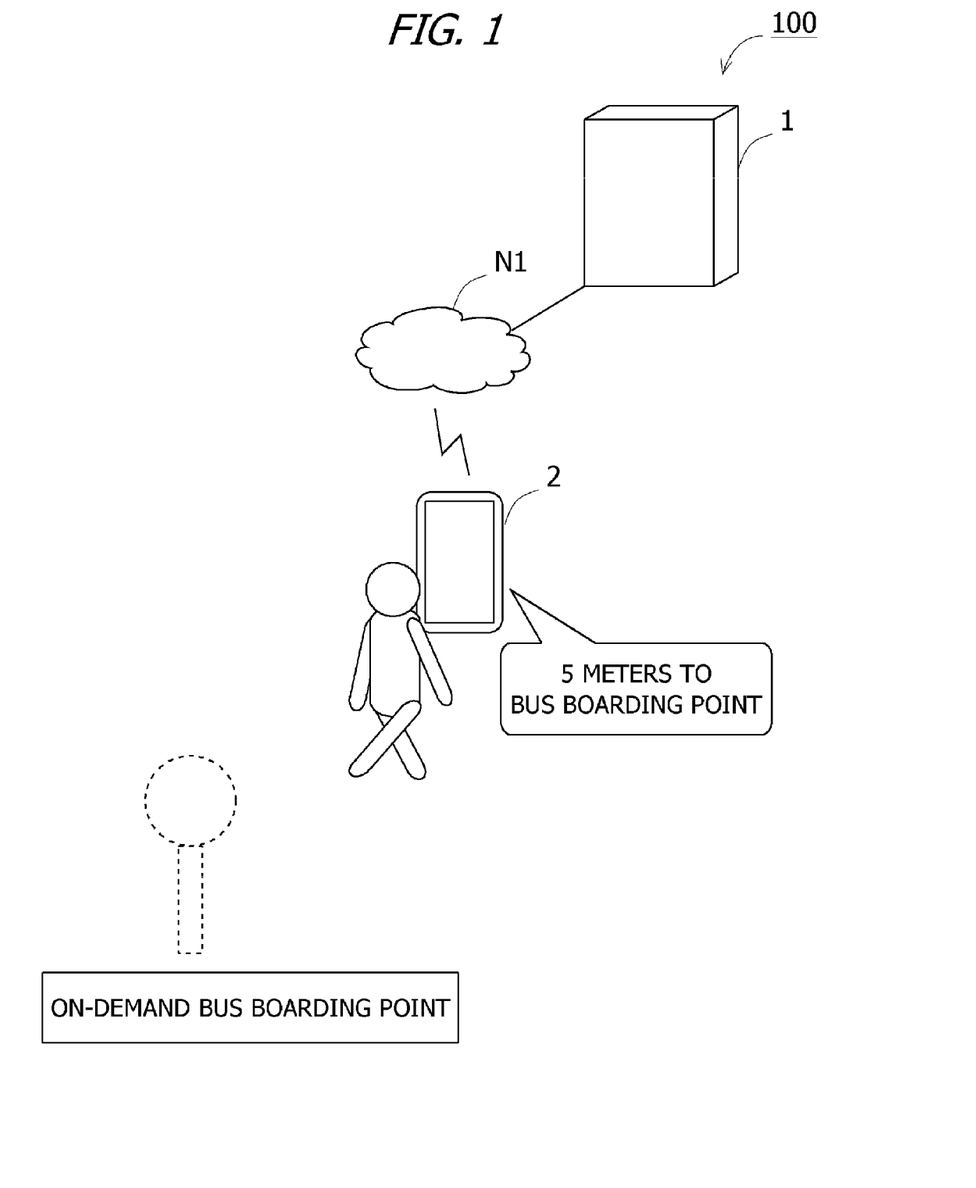
FIG. 1 is a diagram illustrating an example of a system configuration of an on-demand bus system according to a first embodiment.

FIG. 1 is a diagram illustrating an example of a system configuration of an on-demand bus system 100 according to a first embodiment. The on-demand bus system 100 is a system that controls an on-demand bus that is operated in response to a request from a user. The on-demand bus system 100 includes a server 1 and a user terminal 2. The on-demand bus system 100 includes a plurality of user terminals 2, but FIG. 1 extracts and illustrates one user terminal 2.

The server 1 and the user terminal 2 are connected to a network N1, and are capable of communicating via the network N1. The network N1 is a public network such as the Internet, for example.

The user terminal 2 is a terminal where a client application program for using a service of the on-demand bus system 100 is installed. For example, a user of the user terminal 2 is enabled to use a service of the on-demand bus system 100, or in other words, an on-demand bus, by performing user registration in the on-demand bus system 100 through execution of the application program. In the following, a simple term "user" is assumed to indicate a user who owns the user terminal 2. Furthermore, in the following, a simple term "bus" is assumed to indicate the on-demand bus.

In the case of using the on-demand bus, the user transmits a boarding request to the server 1 using the user terminal 2. For example, information about a desired boarding date/time or a desired alighting date/time, a desired boarding point, and a desired alighting point is also transmitted to the server 1, together with the boarding request. When the boarding request is received from the user terminal 2, the server 1 determines a scheduled boarding date/time, a boarding point, and an alighting point based on the desired boarding date/time or the desired alighting date/time, the desired boarding point, and the desired alighting point from the user terminal 2 and the boarding request(s) from other user(s), and fixes a boarding reservation of the user. For example, a plurality of boarding points and alighting points may be set in advance for the on-demand bus and the user may select the desired boarding point and the desired alighting point, or the user may freely specify the desired boarding point and the desired alighting point.

The desired boarding date/time, the desired boarding point, and the desired alighting point of the user may be directly adopted as the scheduled boarding date/time, the boarding point, and the alighting point, but may be made different due to the boarding reservation(s) of other user(s). However, the scheduled boarding date/time, the boarding point, and the alighting point are set to positions and a time close to the desired boarding date/time, the desired boarding point, and the desired alighting point of the user.

When the reservation is fixed, the server 1 transmits reservation information to the user terminal 2, as a response to the boarding request. For example, the reservation information includes the scheduled boarding date/time, a scheduled alighting date/time, the boarding point, and the alighting point.

In the first embodiment, the server 1 acquires position information from the user terminal 2 every predetermined period of time, and notifies the user terminal 2 that the boarding point is getting closer in a case where entry of the user terminal 2 into a range of a first distance of the boarding point is detected. A method of notification of the boarding point getting closer is audio or vibration of the user terminal 2, for example. In the case where the notification method is audio, an audio message such as "5 meters to bus boarding point" may be output from the user terminal 2, for example. The audio message may include a direction of the boarding point from the position of the user terminal 2, for example. Alternatively, in the case where the notification method is audio, a predetermined melody not including a message may be output from the user terminal 2.

Furthermore, in the case where it is detected that the user terminal 2 moved further closer to the boarding point and entered a second distance of the boarding point, the server 1 again notifies the user terminal 2 that the boarding point is getting closer. A method here of notification of the boarding point getting closer is audio or vibration. The first distance and the second distance may each be a predetermined distance or may be set as a walking time, for example. In the case where the first distance and the second distance are each set as a walking time, a walking speed of the user may be set to a predetermined speed, and the first distance may be set to a distance of a 3-minute walk, and the second distance may be set to a 30-second walk, for example.

In the following, a notification that is issued when the user terminal 2 enters the range of the first distance of the boarding point will be referred to as a first notification, and a notification that is issued when the user terminal 2 enters a range of the second distance of the boarding point will be referred to as a second notification. Furthermore, the notification method for the first notification will be referred to as a first method, and the notification method for the second notification will be referred to as a second method. Audio or vibration may be selected by the user as each of the first method and the second method. Furthermore, in the case where the notification method is audio, the user may specify a melody, a song, an audio message or the like that is to be used. In the case where the notification method is vibration, the user may specify a manner of vibration at the time of notification.

In many cases, the boarding point and the alighting point of the on-demand bus are not fixed, and there are no signs. Accordingly, the user may feel unsure about whether he/she is correctly heading to the boarding point. According to the first embodiment, when the user comes close to the boarding point of the on-demand bus, the user is notified that the boarding point of the on-demand bus is getting closer by the user terminal 2 by audio or vibration. Accordingly, the user may grasp that he/she is correctly heading to the boarding point of the on-demand bus, and may feel relaxed. Furthermore, according to the first embodiment, the user may be guided to the boarding point of the on-demand bus. In the case where the boarding point is in an unfamiliar area, or the user is visually disabled, the notification that the boarding point of the on-demand bus is getting closer may be of great help.

Furthermore, in the first embodiment, after the user gets on board the bus, the server 1 issues a notification that alighting approaches, in a case where a distance to the alighting point falls to or below a third distance, and in a case where the distance to the alighting point falls to or below a fourth distance. The fourth distance is smaller than the third distance. The third distance and the fourth distance may each be a specific distance, or may be set as a remaining traveling time of the bus to the alighting point, for example. In the case where the third distance and the fourth distance are each set as a traveling time, a traveling speed of the bus may be set as a predetermined speed, and the third distance may be set to a distance of a 3-minute traveling of the bus, and the fourth distance may be set to a distance of a 1-minute traveling of the bus, for example. A method here of notification of the alighting point getting closer is audio or vibration.

In the following, a notification that is issued when a distance from the user terminal 2 to the alighting point falls to or below the third distance will be referred to as a third notification, and a notification that is issued when the distance from the user terminal 2 to the alighting point falls to or below the fourth distance will be referred to as a fourth notification. Furthermore, the notification method for the third notification will be referred to as a third method, and the notification method for the fourth notification will be referred to as a fourth method. Audio or vibration may be selected by the user as each of the third method and the fourth method. Moreover, the first notification and the second notification may each be referred to as a boarding-related notification. The third notification and the fourth notification may each be referred to as an alighting-related notification. By notifying the user that alighting approaches, the user is enabled to prepare for alighting. The boarding point is an example of "first point". The alighting point is an example of "second point".

Figure 2:
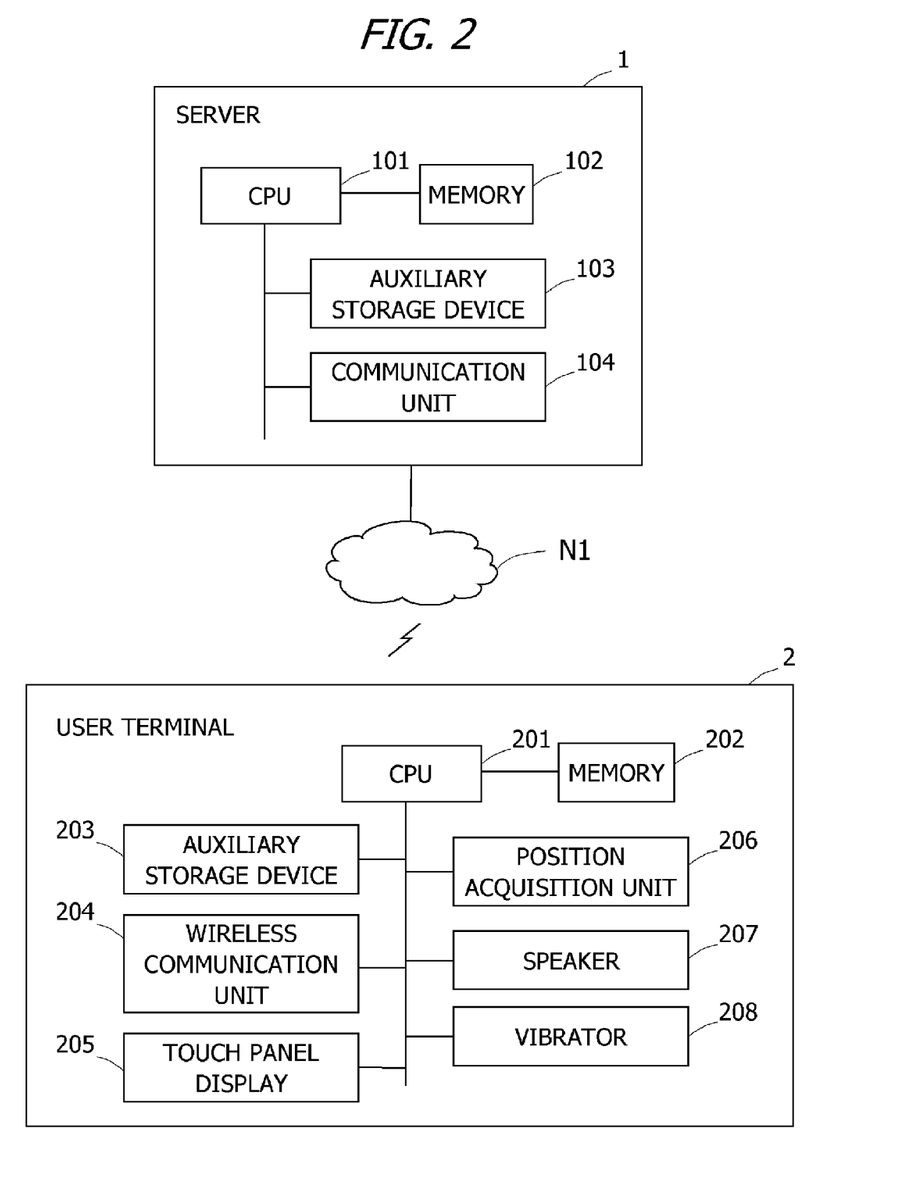
FIG. 2 is an example of a hardware configuration of the server and the user terminal.

FIG. 2 is an example of a hardware configuration of the server 1 and the user terminal 2. As hardware components, the server 1 includes a CPU 101, a memory 102, an auxiliary storage device 103, and a communication unit 104. The memory 102 and the auxiliary storage device 103 are each an example of a non-transitory computer-readable recording medium.

The auxiliary storage device 103 stores various programs, and data that is used by the CPU 101 at the time of execution of each program. For example, the auxiliary storage device 103 is a hard disk drive (HDD), and a solid state drive (SSD). The programs held in the auxiliary storage device 103 include an operation system (OS), and a control program of the on-demand bus system 100, for example. The control program of the on-demand bus system 100 is a program for performing control processes related to reception of reservation, operation and the like of the on-demand bus, for example.

The memory 102 is a main memory that provides to the CPU 101 a storage area and a work area where programs stored in the auxiliary storage device 103 are loaded, and that is used as a buffer, for example. The memory 102 includes semiconductor memories such as a read only memory (ROM) and a random access memory (RAM), for example.

The CPU 101 performs various processes by loading, into the memory 102, and executing the OS and various other programs held in the auxiliary storage device 103. The number of CPUs 101 is not limited to one, and there may be provided a plurality of CPUs 101. The CPU 101 is an example of "processor".

The communication unit 104 is a module, such as a local area network (LAN) card and an optical module, including a circuit for signal processing and which is connected to a network cable. The communication unit 104 is not limited to a circuit that can be connected to a wired network, and may be a wireless signal processing circuit that is capable of processing a wireless signal of a wireless communication network such as WiFi. Note that the hardware configuration of the server 1 is not limited to the one illustrated in FIG. 2.

For example, the user terminal 2 is a smartphone, a tablet terminal, a PC, a wearable terminal, or the like. As hardware components, the user terminal 2 includes a CPU 201, a memory 202, an auxiliary storage device 203, a wireless communication unit 204, a touch panel display 205, a position acquisition unit 206, a speaker 207, and a vibrator 208. The CPU 201, the memory 202, and the auxiliary storage device 203 are the same as the CPU 101, the memory 102, and the auxiliary storage device 103, respectively. However, the auxiliary storage device 203 holds, in addition to the OS, a client application program of the on-demand bus system 100, for example.

The wireless communication unit 204 is a wireless communication circuit that is compatible with a mobile communication method such as 5th generation (5G), 6G, 4G, and long term evolution (LTE), WiMAX, or a wireless communication method such as WiFi, for example. The wireless communication unit 204 connects to an access network by wireless communication and connects to the Internet via the access network, and thereby enables communication with an external apparatus.

The touch panel display 205 displays data according to an instruction from the CPU 201, and outputs a signal input by the user to the CPU 201. The position acquisition unit 206 acquires a current position of the user terminal 2. For example, the position acquisition unit 206 is a global positioning system (GPS) receiver. The position acquisition unit 206 is not limited to the GPS receiver, and in the case of using a position information service of WiFi, the position acquisition unit 206 may be a wireless communication circuit for WiFi, for example. The position information that is acquired by the position acquisition unit 206 is latitude and longitude, or an address, for example.

The speaker 207 is an audio output device that converts audio data input from the CPU 201 into audio and outputs the same. According to an instruction from the CPU 201, the vibrator 208 causes vibration of the vibrator 208 by a linear resonant actuator (LRA) method, an eccentric rotating mass (ERM) method, or a piezoelectric actuator method, for example. Note that the hardware configuration of the user terminal 2 is not limited to the one illustrated in FIG. 2. For example, the user terminal 2 may include a microphone and the like in addition to structural components illustrated in FIG. 2.

Figure 3:
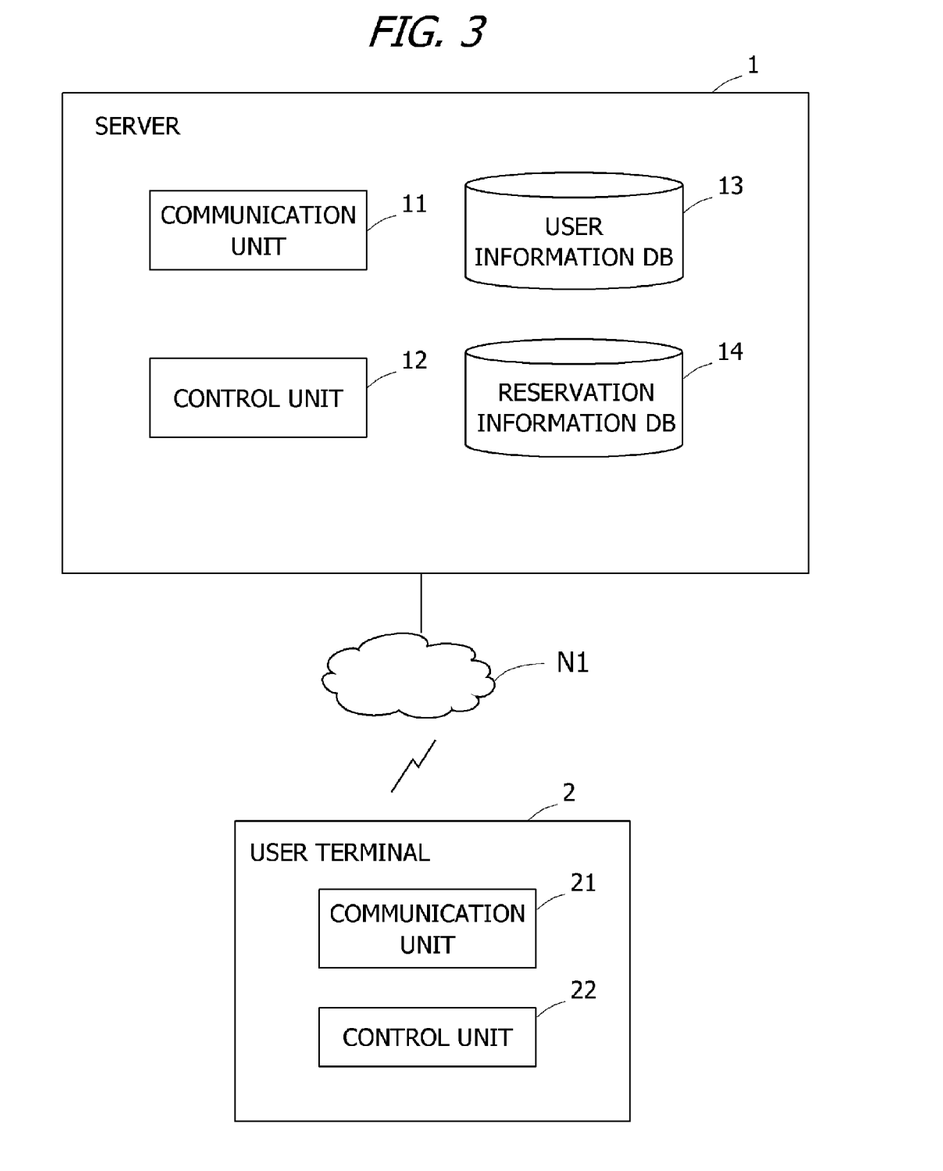
FIG. 3 is a diagram illustrating an example of a functional configuration of the server and the user terminal.

FIG. 3 is a diagram illustrating an example of a functional configuration of the server 1 and the user terminal 2. As functional components, the user terminal 2 includes a communication unit 21 and a control unit 22. Processes by the functional components are processes that are achieved by the CPU 201 of the user terminal 2 executing the client application program of the on-demand bus system 100 that is held in the auxiliary storage device 203.

The communication unit 21 is an interface to the network N1, and transmits/receives data via the wireless communication unit 204. For example, the communication unit 21 transmits, to the server 1, the boarding request and the position information that are input from the control unit 22. For example, the communication unit 21 receives, from the server 1, the reservation information and the notification indicating that the boarding point is getting closer, and outputs the same to the control unit 22.

When a user operation for boarding request is input from the touch panel display 205, the user terminal 2 outputs the boarding request to the communication unit 21, and transmits the same to the server 1 via the communication unit 21. For example, information about the desired boarding date/time or the desired alighting date/time, the desired boarding point, and the desired alighting point input by the user operation is also transmitted to the server 1, together with the boarding request. The control unit 22 receives the reservation information as a response to the boarding request, from the server 1 via the communication unit 21. The reservation information includes identification information of the reservation, the scheduled boarding date/time, the boarding point, and the alighting point, for example. The reservation information is stored in a storage area in the auxiliary storage device 203, for example.

The control unit 22 acquires the position information from the position acquisition unit 206 every predetermined period of time, and transmits the same to the server 1. A transmission period of the position information is set between 0.1 seconds and 1 second, for example. Transmission of the position information to the server 1 may be performed at all times during operation of the server 1, or may be performed during a period related to the boarding reservation, such as from a time that is a predetermined time length before the scheduled boarding date/time to when alighting is detected, for example.

In the case where instructions regarding the first notification and the second notification are received from the server 1 via the communication unit 21, the control unit 22 issues notifications indicating that the boarding point is getting closer. Furthermore, in the case where instructions regarding the third notification and the fourth notification are received from the server 1 via the communication unit 21, the control unit 22 issues notifications indicating that alighting approaches. Together with each of the instructions regarding the first notification, the second notification, the third notification, and the fourth notification, information about the notification method is also received, for example. In the case where the notification method is audio, for example, information about the notification method includes information indicating that the notification method is audio, and information about the audio that is to be output. Information about the audio that is to be output is, in the case of outputting an audio message, text data of a message, and is, in the case of using sound source data held in the user terminal 2, identification information of the sound source data or the sound source data itself, for example. In the case where the notification method is vibration, information about the notification method includes information indicating that the notification method is vibration, and a vibration pattern, for example.

In the case where the notification method is audio, the control unit 22 causes the speaker 207 to output audio according to the information about the audio that is to be output. For example, in the case where the audio message is to be output, the audio according to the information about the audio that is to be output is audio converted from the text data of a message received from the server 1, sound source data, which is read from the auxiliary storage device 203, corresponding to the identification information of sound source data received from the server 1, or sound source data that is received from the server 1. In the case where the notification method is vibration, the control unit 22 causes the vibrator 208 to vibrate for a predetermined period of time with the vibration pattern that is received from the server 1.

Next, the server 1 includes, as functional components, a communication unit 11, a control unit 12, a user information DB 13, and a reservation information DB 14. Processes by the functional components are processes that are achieved by the CPU 101 of the server 1 executing the control program of the on-demand bus system 100 that is held in the auxiliary storage device 103.

The communication unit 11 is an interface to the network N1. The communication unit 11 outputs data that is received via the network N1, to the control unit 12. Furthermore, the communication unit 11 transmits data that is input from the control unit 12, to a predetermined apparatus via the network N1.

In the case where the boarding request is received from the user terminal 2 via the communication unit 11, the control unit 12 performs a process of receiving a boarding reservation. For example, information about the desired boarding date/time or the desired alighting date/time, the desired boarding point, and the desired alighting point is also received together with the boarding request. In the boarding reservation reception process, the control unit 12 determines whether or not there is a bus that can be dispatched to the desired boarding point on the desired boarding date/time, or whether or not there is a bus that can be dispatched to the desired alighting point on the desired alighting date/time, for example. With respect to the determination here, a positive determination is made in the case where there is a bus for which there is no boarding reservation on the desired boarding date/time or the desired alighting date/time, or in the case where there is a bus that is scheduled to travel near the desired boarding point or the desired alighting point on around the desired boarding date/time or around the desired alighting date/time, for example.

Furthermore, in the boarding reservation reception process, in the case where there is a bus that can be dispatched, the control unit 12 determines, in relation to the boarding reservation based on the boarding request, the boarding point, the scheduled boarding date/time, the alighting point, and the scheduled alighting date/time. The boarding point, the scheduled boarding date/time, the alighting point, and the scheduled alighting date/time are determined taking into account other boarding reservation(s). The method for determining the boarding point, the scheduled boarding date/time, the alighting point, and the scheduled alighting date/time may be any known method, and is not limited to a specific method.

When the boarding point, the scheduled boarding date/time, the alighting point, and the scheduled alighting date/time are determined, the boarding reservation is fixed. When the boarding reservation is fixed, the control unit 12 transmits the reservation information to the user terminal 2 as a response to the boarding request.

The control unit 12 performs processes related to the boarding-related notification and the alighting-related notification for each boarding reservation. When a time that is a predetermined time length before the scheduled boarding date/time of the boarding reservation is reached, the control unit 12 starts to monitor the position information of the user terminal 2. Monitoring of the position information of the user terminal 2 is started when a time that is 10 to 30 minutes before the scheduled boarding date/time of the boarding reservation is reached, for example.

The control unit 12 acquires the position information from the user terminal 2 via the communication unit 11 every predetermined period of time, and monitors a relationship between the position of the user terminal 2 and the boarding point. In the case where entry of the user terminal 2 into the range of the first distance of the boarding point is detected, the control unit 12 transmits the instruction regarding the first notification to the user terminal 2. Then, in the case where entry of the user terminal 2 into the range of the second distance of the boarding point is detected, the control unit 12 transmits the instruction regarding the second notification to the user terminal 2.

Furthermore, in the case where arrival of the user terminal 2 at the boarding point is detected based on the position information of the user terminal 2, the control unit 12 instructs the user terminal 2 to issue a notification of arrival at the boarding point. In the following, the notification indicating arrival at the boarding point will be referred to as a boarding point arrival notification. With the boarding point arrival notification, an audio message announcing arrival at the boarding point is output from the user terminal 2, for example. Furthermore, the boarding point arrival notification may also indicate waiting at the current position.

When boarding of the user on the bus is detected, the control unit 12 monitors a relationship between the position information of the user terminal 2 and the alighting point. Boarding of the user on the bus is detected when movement is performed while the position information of the user terminal 2 and position information of the bus indicate a same position, or when a boarding report is received from the user terminal 2, an in-vehicle device on the bus, or an operation terminal used by a driver, for example.

In the case where the distance from the user terminal 2 to the alighting point is detected to have fallen to or below the third distance, the control unit 12 transmits the instruction regarding the third notification to the user terminal 2. In the case where the distance from the user terminal 2 to the alighting point is detected to have fallen to or below the fourth distance, the control unit 12 transmits the instruction regarding the fourth notification to the user terminal 2.

Furthermore, in the case where arrival of the user terminal 2 at the alighting point is detected based on the position information of the user terminal 2, the control unit 12 instructs the user terminal 2 to issue a notification of arrival at the alighting point. In the following, the notification indicating arrival at the alighting point will be referred to as an alighting point arrival notification. With the alighting point arrival notification, an audio message announcing arrival at the alighting point is output from the user terminal 2, for example.

The user information DB 13 and the reservation information DB 14 are created in a storage area in the auxiliary storage device 103. The user information DB 13 holds information about the user. The reservation information DB 14 holds information about the boarding reservation. Note that the functional configurations of the server 1 and the user terminal 2 are not limited to those illustrated in FIG. 3.

Figure 4:
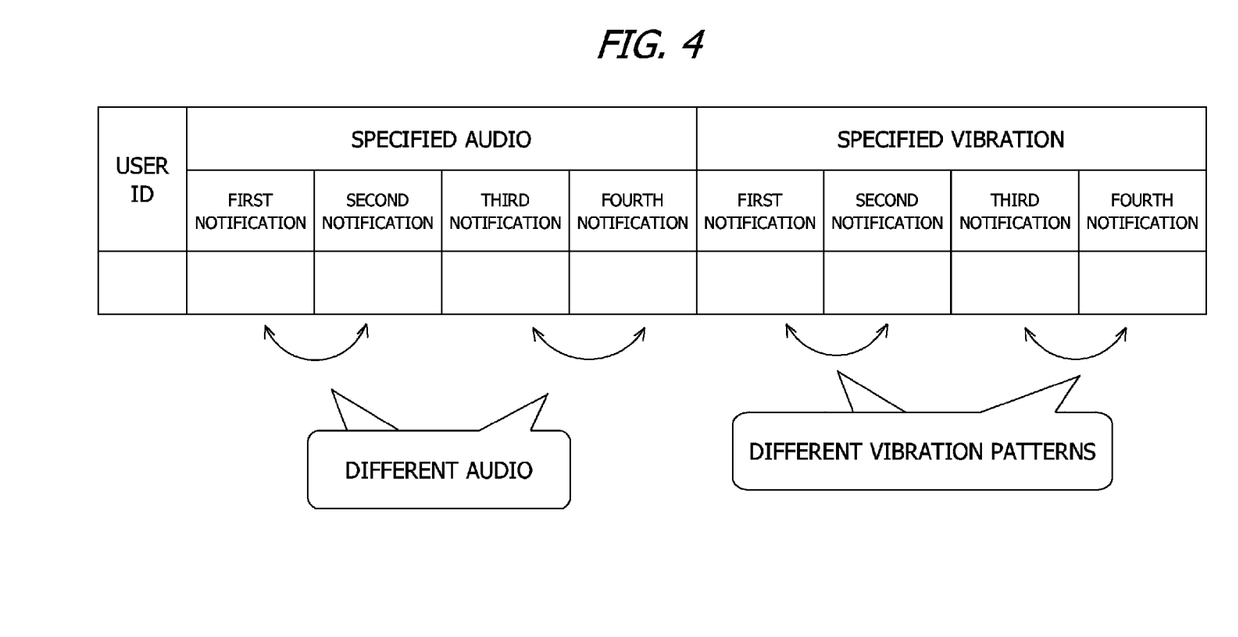
FIG. 4 is an example of the information that is held in the user information database.

FIG. 4 is an example of the information that is held in the user information DB 13. The user information DB 13 stores information about the user. One record in the user information DB 13 corresponds to one user. A record in the user information DB 13 includes fields "user ID", "specified audio", and "specified vibration". Identification information of the user is stored in the field "user ID".

The fields "specified audio" and "specified vibration" each include subfields "first notification", "second notification", "third notification", and "fourth notification". Information about the audio that is specified by the user and that is to be output by the notification is stored in each subfield of "specified audio". Information about the audio is the name of a song, the name of a melody, or a code, for example. Information about the vibration pattern that is specified by the user and that is to be used by the notification is stored in each subfield of "specified vibration". Information indicating the vibration pattern is an identification number, the name of a pattern, a code, or a flag, for example.

In the case where the audio that is to be output or the vibration pattern is specified by the user at the time of user registration or at the time of boarding reservation, for example, a value is stored in each subfield of each of the fields "specified audio" and "specified vibration". In the case where there is no specification by the user, each subfield of each of the fields "specified audio" and "specified vibration" is empty or stores a Null value. In the case where there is no specification by the user, audio or a vibration pattern that is set by default is used.

In the case where one of audio or vibration is selected as the notification method in relation to both the first notification and the second notification that are the boarding-related notifications, audio or the vibration pattern is set by default to be different between the first notification and the second notification. In the same manner, in the case where one of audio or vibration is selected as the notification method in relation to both the third notification and the fourth notification that are the alighting-related notifications, audio or the vibration pattern is set by default to be different between the third notification and the fourth notification. The user may thus grasp that the boarding point or the alighting point is getting closer but that the distance is different between the first notification and the second notification or the third notification and the fourth notification.

In the case where audio is selected as the notification method in relation to both the first notification and the second notification that are the boarding-related notifications, a volume of output audio may be set louder or a speed of the output audio may be set faster for the second notification than for the first notification. In the same manner, in the case where audio is selected as the notification method in relation to both the third notification and the fourth notification that are the alighting-related notifications, the volume of output audio may be set louder or the speed of the output audio may be set faster for the fourth notification than for the third notification. When the volume or the playback speed is increased as the boarding point or the alighting point gets closer, the distance and the volume or the speed may be linked to each other, and that the boarding point or the alighting point is getting closer can be intuitively grasped.

In the case where vibration is selected as the notification method in relation to both the first notification and the second notification that are the boarding-related notifications, the vibration at the time of the second notification may be set stronger than the vibration at the time of the first notification. In the same manner, in the case where vibration is selected as the notification method in relation to both the third notification and the fourth notification that are the alighting-related notifications, the vibration at the time of the fourth notification may be set stronger than the vibration at the time of the third notification. When the vibration is made stronger as the boarding point or the alighting point gets closer, the distance and a level of the vibration may be linked to each other, and that the boarding point or the alighting point is getting closer can be intuitively grasped.

Furthermore, in the case where one of audio or vibration is selected as the notification method in relation to both the first notification and the second notification that are the boarding-related notifications, and the user is to specify the audio that is to be output or the vibration pattern, the user may be made to specify different audio or vibration patterns for the first notification and the second notification. In the same manner, in the case where one of audio or vibration is selected as the notification method in relation to both the third notification and the fourth notification that are the alighting-related notifications, and the user is to specify the audio that is to be output or the vibration pattern, the user may be made to specify different audio or vibration patterns for the third notification and the fourth notification. Note that information that is held in the user information DB 13 is not limited to the information illustrated in FIG. 4.

Figure 5:
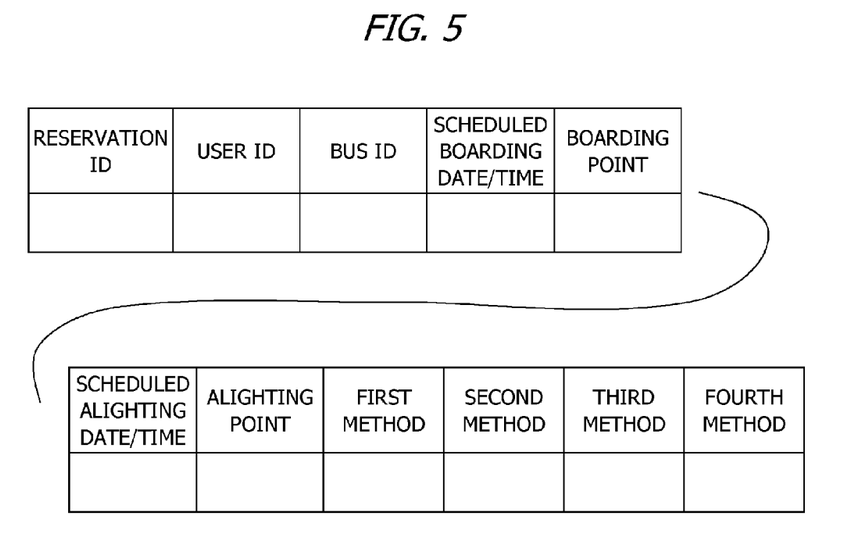
FIG. 5 is an example of the information that is held in the reservation information database in the server.

FIG. 5 is an example of the information that is held in the reservation information DB 14 in the server 1. The reservation information DB 14 stores information about the boarding reservation. One record that is held in the reservation information DB 14 is information about one reservation for boarding of one user. A record in the reservation information DB 14 is created by the control unit 12 when a boarding reservation is fixed. A record that is held in the reservation information DB 14 includes fields "reservation ID", "user ID", "bus ID", "scheduled boarding date/time", "boarding point", "scheduled alighting date/time", "alighting point", "boarding-related notification method ID", "alighting-related notification method ID", "first method", "second method", "third method", and "fourth method".

Identification information of a boarding reservation is stored in the field "reservation ID". Identification information of a user who is to get on board is stored in the field "user ID". Identification information of a bus that is to be dispatched in relation to the boarding reservation is stored in "bus ID". Information pieces about the scheduled boarding date/time, the boarding point, the scheduled alighting date/time, and the alighting point that are established at the time when the reservation is fixed are stored in the fields "scheduled boarding date/time", "boarding point", "scheduled alighting date/time", and "alighting point", respectively. As the information about the boarding point and the alighting point, latitude and longitude, an address, the name of a landmark, or the like may be used, for example.

Information pieces indicating whether the first notification, the second notification, the third notification, and the fourth notification are to be performed by audio or vibration are stored in the fields "first method", "second method", "third method", and "fourth method", respectively. That is, information indicating one of audio or vibration is stored in each of the fields "first method", "second method", "third method", and "fourth method". The information indicating one of audio or vibration is a keyword "audio" or "vibration", a code, or a flag, for example.

Audio or vibration is selected by the user at the time of the boarding reservation, for each of the first method, the second method, the third method, and the fourth method. In the case where there is no specification by the user, audio is used by each notification method, for example. However, initial values for the first method, the second method, the third method, and the fourth method are not limited to audio. Note that information that is held in the reservation information DB 14 is not limited to the information illustrated in FIG. 5.

Figure 6:
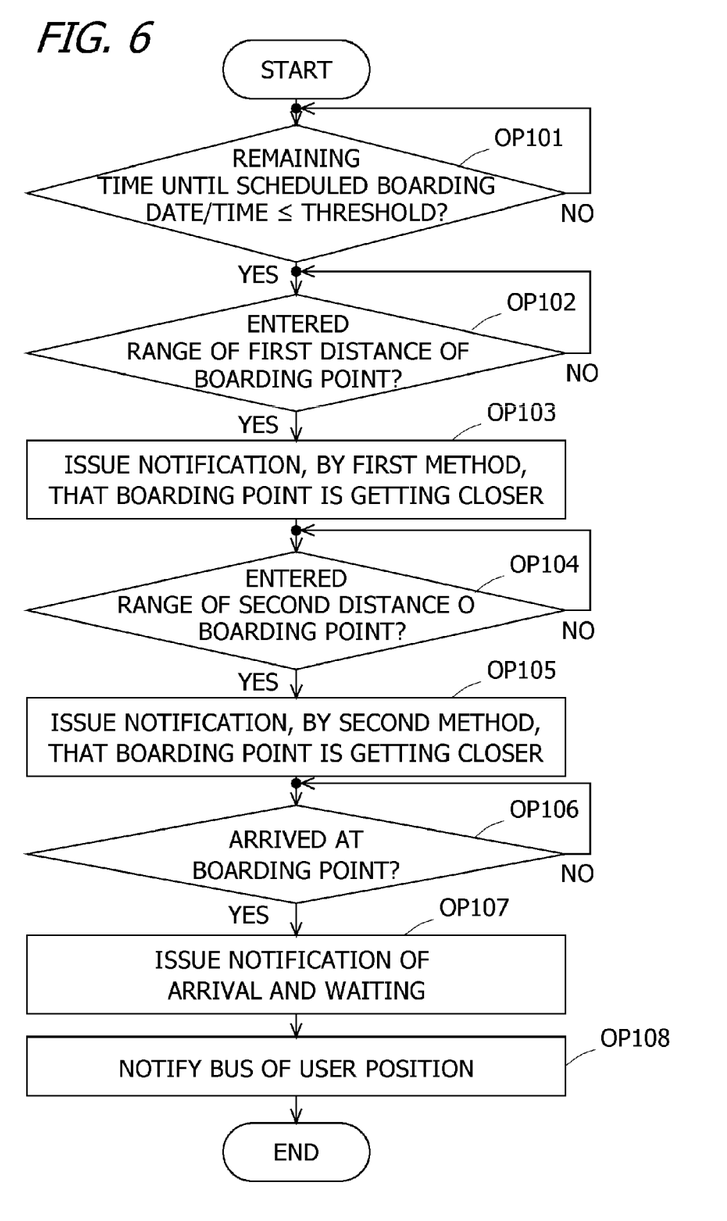
FIG. 6 is an example of a flowchart of a boarding-related notification process by the server.

FIG. 6 is an example of a flowchart of a boarding-related notification process by the server 1. The process illustrated in FIG. 6 is performed for one boarding reservation that is not yet processed, or in other words, for each unprocessed record in the reservation information DB 14. The process illustrated in FIG. 6 is started when a boarding reservation is fixed, for example. A main performer of the process illustrated in FIG. 6 is a hardware component such as the CPU 101 of the server 1, but a functional component is described as the performer for the sake of convenience.

In OP101, the control unit 12 determines whether or not a remaining time to the scheduled boarding date/time is equal to or smaller than a threshold. The scheduled boarding date/time is acquired from the reservation information DB 14. In the case where the remaining time to the scheduled boarding date/time is equal to or smaller than the threshold (OP101: YES), the process proceeds to OP102. In the case where the remaining time to the scheduled boarding date/time is greater than the threshold (OP101: NO), the process in OP101 is repeated.

In OP102, the control unit 12 determines whether or not the user terminal 2 entered the range of the first distance of the boarding point, based on the position information of the user terminal 2. Information about the boarding point is acquired from the reservation information DB 14. In the case where the user terminal 2 entered the range of the first distance of the boarding point (OP102: YES), the process proceeds to OP103. In the case where the user terminal 2 is not in the range of the first distance of the boarding point (OP102: NO), the process in OP102 is repeated. An error may be determined in a case where a positive determination is not made in the process in OP102 even after a lapse of a predetermined period of time.

In OP103, the control unit 12 transmits the instruction regarding the first notification to the user terminal 2. Information about the first method is also transmitted to the user terminal 2, together with the instruction regarding the first notification. For example, in the case where the first method is audio, information about the first method includes information indicating that the first method is audio, and information about the audio that is to be output. For example, in the case where the first method is vibration, information about the first method includes information indicating that the first method is vibration, and information about the vibration pattern to be used. When the instruction regarding the first notification is received, the user terminal 2 issues a notification that the boarding point is getting closer, by the first method.

In OP104, the control unit 12 determines whether or not the user terminal 2 entered the range of the second distance of the boarding point, based on the position information of the user terminal 2. In the case where the user terminal 2 entered the range of the second distance of the boarding point (OP104: YES), the process proceeds to OP105. In the case where the user terminal 2 is not in the range of the second distance of the boarding point (OP104: NO), the process in OP104 is repeated. An error may be determined in a case where a positive determination is not made in the process in OP104 even after a lapse of a predetermined period of time, for example.

In OP105, the control unit 12 transmits the instruction regarding the second notification to the user terminal 2. Information about the second method is also transmitted to the user terminal 2, together with the instruction regarding the second notification. When the instruction regarding the second notification is received, the user terminal 2 issues a notification that the boarding point is getting closer, by the second method.

In OP106, the control unit 12 determines whether or not the user terminal 2 is at the boarding point, based on the position information of the user terminal 2. In the case where the user terminal 2 is at the boarding point (OP106: YES), the process proceeds to OP107. In the case where the user terminal 2 is not yet at the boarding point (OP106: NO), the process in OP106 is repeated. An error may be determined in a case where a positive determination is not made in the process in OP106 even after a lapse of a predetermined period of time after the scheduled boarding date/time, for example.

In OP106, a positive determination may be made in a case where the user terminal 2 is not strictly at the boarding point but is within an allowable range of the boarding point. The allowable range is set to a range of one meter to five meters, for example.

In OP107, the control unit 12 transmits, to the user terminal 2, an audio message indicating that the boarding point is reached, and that waiting is to be performed at the current position. The audio message indicating that the boarding point is reached, and that waiting is to be performed at the current position is thus output from the user terminal 2. The notification regarding arrival and waiting in OP107 may be performed by vibration instead of the audio message.

In OP108, the control unit 12 notifies the in-vehicle device on the bus that the user is scheduled to get on of the position of the user terminal 2. The driver of the bus may thus easily find the user who is waiting near the boarding point. Then, the process illustrated in FIG. 6 is ended. The boarding-related notification process is not limited to the process illustrated in FIG. 6, and may be changed as appropriate according to the embodiment.

Figure 7:
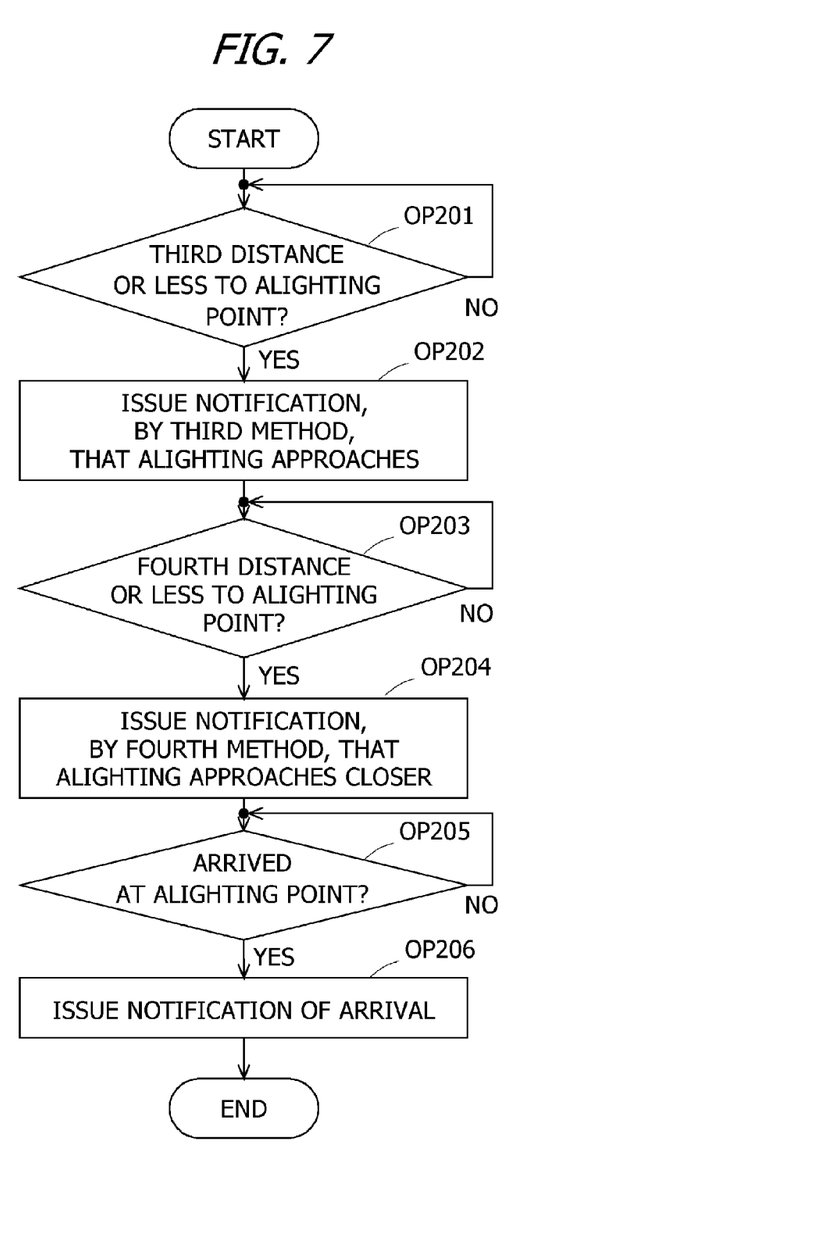
FIG. 7 is an example of a flowchart of an alighting-related notification process by the server.

FIG. 7 is an example of a flowchart of an alighting-related notification process by the server 1. The process illustrated in FIG. 7 is started when the boarding-related notification process illustrated in FIG. 6 is ended, or when boarding of the user terminal 2 on the bus is detected, for example. The main performer of the process illustrated in FIG. 7 is a hardware component such as the CPU 101 of the server 1, but a functional component is described as the performer for the sake of convenience.

In OP201, the control unit 12 determines whether or not the distance from the user terminal 2 to the alighting point is equal to or smaller than the third distance, based on the position information of the user terminal 2, for example. Information about the alighting point is acquired from the reservation information DB 14. In the case where the distance from the user terminal 2 to the alighting point is equal to or smaller than the third distance (OP201: YES), the process proceeds to OP202. In the case where the distance from the user terminal 2 to the alighting point is greater than the third distance (OP201: NO), the process in OP201 is repeated.

In OP202, the control unit 12 transmits the instruction regarding the third notification to the user terminal 2. Information about the third method is also transmitted to the user terminal 2, together with the instruction regarding the third notification. When the instruction regarding the third notification is received, the user terminal 2 issues a notification that alighting approaches, by the third method.

In OP203, the control unit 12 determines whether or not the distance from the user terminal 2 to the alighting point is equal to or smaller than the fourth distance, based on the position information of the user terminal 2, for example. In the case where the distance from the user terminal 2 to the alighting point is equal to or smaller than the fourth distance (OP203: YES), the process proceeds to OP204. In the case where the distance from the user terminal 2 to the alighting point is greater than the fourth distance (OP203: NO), the process in OP203 is repeated.

In OP204, the control unit 12 transmits the instruction regarding the fourth notification to the user terminal 2. Information about the fourth method is also transmitted to the user terminal 2, together with the instruction regarding the fourth notification. When the instruction regarding the fourth notification is received, the user terminal 2 issues a notification that alighting approaches closer, by the fourth method.

In OP205, the control unit 12 determines whether or not the user terminal 2 is at the alighting point, based on the position information of the user terminal 2, for example. In the case where the user terminal 2 is at the alighting point (OP205: YES), the process proceeds to OP206. In the case where the user terminal 2 is not yet at the alighting point (OP205: NO), the process in OP205 is repeated.

In OP206, the control unit 12 transmits, to the user terminal 2, an audio message indicating that the alighting point is reached. The audio message indicating that the alighting point is reached is thus output from the user terminal 2. The notification regarding arrival at the alighting point may be performed by vibration instead of the audio message. Then, the process illustrated in FIG. 7 is ended. The process illustrated in FIG. 7 is an example, and the alighting-related notification process is not limited to the process illustrated in FIG. 7. For example, determination in OP201 and OP203 may be performed based on the position information of the bus that the user is taking.

<Advantages and Effects of First Embodiment>

In the first embodiment, when the boarding point of the on-demand bus gets close, a notification that the boarding point is close is issued by the user terminal 2 by audio or vibration. Accordingly, even in a case where the boarding point is set to a location where there is no sign, or where the user is visually disabled, for example, the user may be guided to the boarding point by the notification and may more certainly reach the boarding point. Furthermore, the user may grasp that he/she is certainly heading to the boarding point, and may feel relaxed.

Furthermore, in the first embodiment, the user is notified, in stages, that the boarding point is getting closer, when entering the range of the first distance of the boarding point, and when entering the range of the second distance, and the user may be more certainly guided to the boarding point. Furthermore, even in a case where the same notification method, that is, audio, is selected in relation to the first notification and the second notification, different audio is output, and thus, the user may intuitively grasp the distance to the boarding point or that the boarding point is getting closer, for example.

Moreover, in the first embodiment, a notification is issued by the user terminal 2 by audio or vibration also when alighting approaches. With the on-demand bus, alighting points are not fixed, and in the case where there are a plurality of passengers, it is not easy for the user to grasp arrival at the alighting point where he/she is to get off. According to the first embodiment, a notification is issued when alighting approaches, and thus, the user may comfortably prepare for alighting.

Other Embodiments

The embodiments described above are examples, and the present disclosure may be changed and carried out as appropriate without departing from the gist of the present disclosure.

In the first embodiment, the server 1 is described as the apparatus that performs the boarding-related notification process and the alighting-related notification process, but the boarding-related notification process and the alighting-related notification process may instead be performed by the user terminal 2. In the case where the user terminal 2 is to perform the boarding-related notification process, the process of notifying the bus of the position of the user when the user arrives at the boarding point is performed by the server 1.

In the first embodiment, an example is described where the boarding-related notification process and the alighting-related notification process are applied to the on-demand bus system, but the boarding-related notification process and the alighting-related notification process may also be applied to a bus system as a public transport system, a ride-sharing service system, and a vehicle dispatch service system.

The processes and means described in the present disclosure may be freely combined to the extent that no technical conflict exists.

A process which is described to be performed by one device may be performed among a plurality of devices. Processes described to be performed by different devices may be performed by one device. Each function to be implemented by a hardware component (server component) in a computer system may be flexibly changed.

The present disclosure may also be implemented by supplying a computer program for implementing a function described in the embodiment above to a computer, and by reading and executing the program by at least one processor of the computer. Such a computer program may be provided to a computer by a non-transitory computer-readable storage medium which is connectable to a system bus of a computer, or may be provided to a computer through a network. The non-transitory computer-readable storage medium may be any type of disk such as a magnetic disk (floppy (registered trademark) disk, a hard disk drive (HDD), etc.), an optical disk (CD-ROM, DVD disk, Blu-ray disk, etc.), a read only memory (ROM), a random access memory (RAN), an EPROM, an EEPROM, a magnetic card, a flash memory, an optical card, and any type of medium which is suitable for storing electronic instructions.

What is claimed is:

1. An information processing apparatus comprising a processor configured to:
    acquire position information of a user terminal;
    acquire first information that is information about a reservation for use of a vehicle provided for a vehicle dispatch service by a user of the user terminal, the first information including at least a boarding point and a scheduled boarding time; and
    cause the user terminal to issue a first notification by audio or vibration in a case where a distance between a first point where the user is to get on board the vehicle provided for the vehicle dispatch service and the user terminal falls to or below a first distance, the first notification indicating that the first point is getting closer; wherein
    the first point is a position that is determined at a time of reservation for boarding the vehicle provided for the vehicle dispatch service, and
    when a time that is a predetermined time length before the scheduled boarding time is reached, start determination of whether or not the distance between the first point and the user terminal is equal to or smaller than the first distance.

2. The information processing apparatus according to claim 1, wherein the processor is further configured to cause the user terminal to issue a second notification by audio or vibration in a case where the distance between the first point and the user terminal falls to or below a second distance that is smaller than the first distance, the second notification indicating that the first point is getting closer.

3. The information processing apparatus according to claim 2, wherein, in a case where the first notification and the second notification are both issued by audio, the processor is configured to cause audio that is output from the user terminal or a mode of output of the audio from the user terminal to be different between the first notification and the second notification.

4. The information processing apparatus according to claim 2, wherein, in a case where the first notification and the second notification are both issued by audio, the processor is configured to adopt audio that is specified by the user terminal as audio that is output from the user terminal, in relation to at least one of the first notification and the second notification.

5. The information processing apparatus according to claim 2, wherein, in a case where the first notification and the second notification are both issued by vibration, the processor is configured to cause a mode of vibration of the user terminal to vary between the first notification and the second notification.

6. The information processing apparatus according to claim 5, wherein the processor is configured to make vibration of the user terminal stronger for the second notification than for the first notification.

7. The information processing apparatus according to claim 1, wherein, in a case where the first point is reached by the user terminal, the processor is configured to instruct the user terminal to issue a notification of waiting at a current position.

8. The information processing apparatus according to claim 1, wherein, in a case where the first point is reached by the user terminal, the processor is configured to notify the vehicle provided for the vehicle dispatch service that the user is scheduled to get on of the position information of the user terminal.

9. The information processing apparatus according to claim 1, wherein
    in a case where the first point is reached by the user terminal, the processor is configured to instruct the user terminal to output waiting at a current position, and notify a bus that the user is scheduled to get on of the position information of the user terminal.

10. The information processing apparatus according to claim 1, wherein the processor is further configured to cause the user terminal to issue a third notification by audio or vibration in a case where a distance between a second point where the user is to alight from the vehicle provided for the vehicle dispatch service and a position of the user terminal falls to or below a third distance, the third notification indicating that alighting approaches.

11. The information processing apparatus according to claim 10, wherein the processor is further configured to cause the user terminal to issue a fourth notification by audio or vibration in a case where the distance between the second point and the user terminal falls to or below a fourth distance that is smaller than the third distance, the fourth notification indicating that alighting approaches closer.

12. The information processing apparatus according to claim 11, wherein, in a case where the third notification and the fourth notification are both issued by audio, the processor is configured to cause audio that is output from the user terminal or a mode of output of the audio from the user terminal to be different between the third notification and the fourth notification.

13. The information processing apparatus according to claim 11, wherein, in a case where the third notification and the fourth notification are both issued by vibration, the processor is configured to cause a mode of vibration of the user terminal to vary between the third notification and the fourth notification.

14. A method executed by a computer comprising:
   acquiring position information of a user terminal;
   acquiring first information that is information about a reservation for use of a vehicle provided for a vehicle dispatch service by a user of the user terminal, the first information including at least a boarding point and a scheduled boarding time; and
   causing the user terminal to issue a first notification by audio or vibration in a case where a distance between a first point where the user is to get on board the vehicle provided for the vehicle dispatch service and the user terminal falls to or below a first distance, the first notification indicating that the first point is getting closer; wherein
   the first point is a position that is determined at a time of reservation for boarding the vehicle provided for the vehicle dispatch service, and
   when a time that is a predetermined time length before the scheduled boarding time is reached, start determination of whether or not the distance between the first point and the user terminal is equal to or smaller than the first distance.

15. The method according to claim 14, further comprising causing, by the computer, the user terminal to issue a second notification by audio or vibration in a case where the distance between the first point and the user terminal falls to or below a second distance that is smaller than the first distance, the second notification indicating that the first point is getting closer.

* * * * *